(12) United States Patent
Morimoto

(10) Patent No.: US 8,515,170 B2
(45) Date of Patent: Aug. 20, 2013

(54) IMAGE CORRECTION APPARATUS AND CORRECTION PARAMETER CREATION APPARATUS

(75) Inventor: Masami Morimoto, Fuchu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 22 days.

(21) Appl. No.: 13/216,935

(22) Filed: Aug. 24, 2011

(65) Prior Publication Data
US 2012/0051637 A1 Mar. 1, 2012

(30) Foreign Application Priority Data
Aug. 24, 2010 (JP) .................. 2010-187530

(51) Int. Cl.
*G06K 9/00* (2006.01)
*G06K 9/34* (2006.01)

(52) U.S. Cl.
USPC ........................................... 382/169

(58) Field of Classification Search
USPC ............ 382/168, 169, 171, 172, 254, 274; 348/671–674, 678, 686, E5.073
See application file for complete search history.

(56) References Cited

U.S. PATENT DOCUMENTS

| | | | |
|---|---|---|---|
| 6,704,446 B2 | 3/2004 | Shigeta et al. | |
| 6,934,409 B2 * | 8/2005 | Ohara | 382/132 |
| 7,102,697 B2 * | 9/2006 | Lei et al. | 348/678 |
| 7,636,472 B2 | 12/2009 | Maruoka | |
| 7,639,893 B2 * | 12/2009 | Duan et al. | 382/274 |
| 8,009,907 B1 * | 8/2011 | Srinivasan et al. | 382/168 |
| 2001/0036312 A1 | 11/2001 | Shigeta et al. | |
| 2005/0058341 A1 | 3/2005 | Maruoka | |
| 2007/0076974 A1 | 4/2007 | Miyazawa | |
| 2009/0002285 A1 | 1/2009 | Baba et al. | |
| 2011/0267543 A1 | 11/2011 | Miyazawa | |
| 2012/0051637 A1 * | 3/2012 | Morimoto | 382/169 |

FOREIGN PATENT DOCUMENTS

| | | |
|---|---|---|
| JP | 2001-268391 A | 9/2001 |
| JP | 2005-108208 A | 4/2005 |
| JP | 2007-096997 A | 4/2007 |
| JP | 2008-042768 | 2/2008 |
| JP | 2009-008916 | 1/2009 |
| JP | 2009-252051 A | 10/2009 |
| JP | 2010-258502 A | 11/2010 |

OTHER PUBLICATIONS

Notice of Reasons for Rejection mailed by Japan Patent Office on Jan. 31, 2012 in the corresponding Japanese patent application No. 2010-187530.

* cited by examiner

*Primary Examiner* — Amir Alavi
(74) *Attorney, Agent, or Firm* — Knobbe, Martens, Olson & Bear LLP

(57) ABSTRACT

According to one embodiment, a correction parameter creation apparatus includes a histogram creation module and a parameter creation module. The histogram creation module is configured to create a histogram of luminance values in an input image. The parameter creation module is configured to create a parameter indicating an input-output characteristic to correct the input image by equalizing the histogram. Where the histogram creation module is configured to determine whether a target pixel in the input image is a local low-luminance pixel or not, and omit to count a frequency of a luminance value of the target pixel if the target pixel is determined to be the local low-luminance pixel.

5 Claims, 5 Drawing Sheets

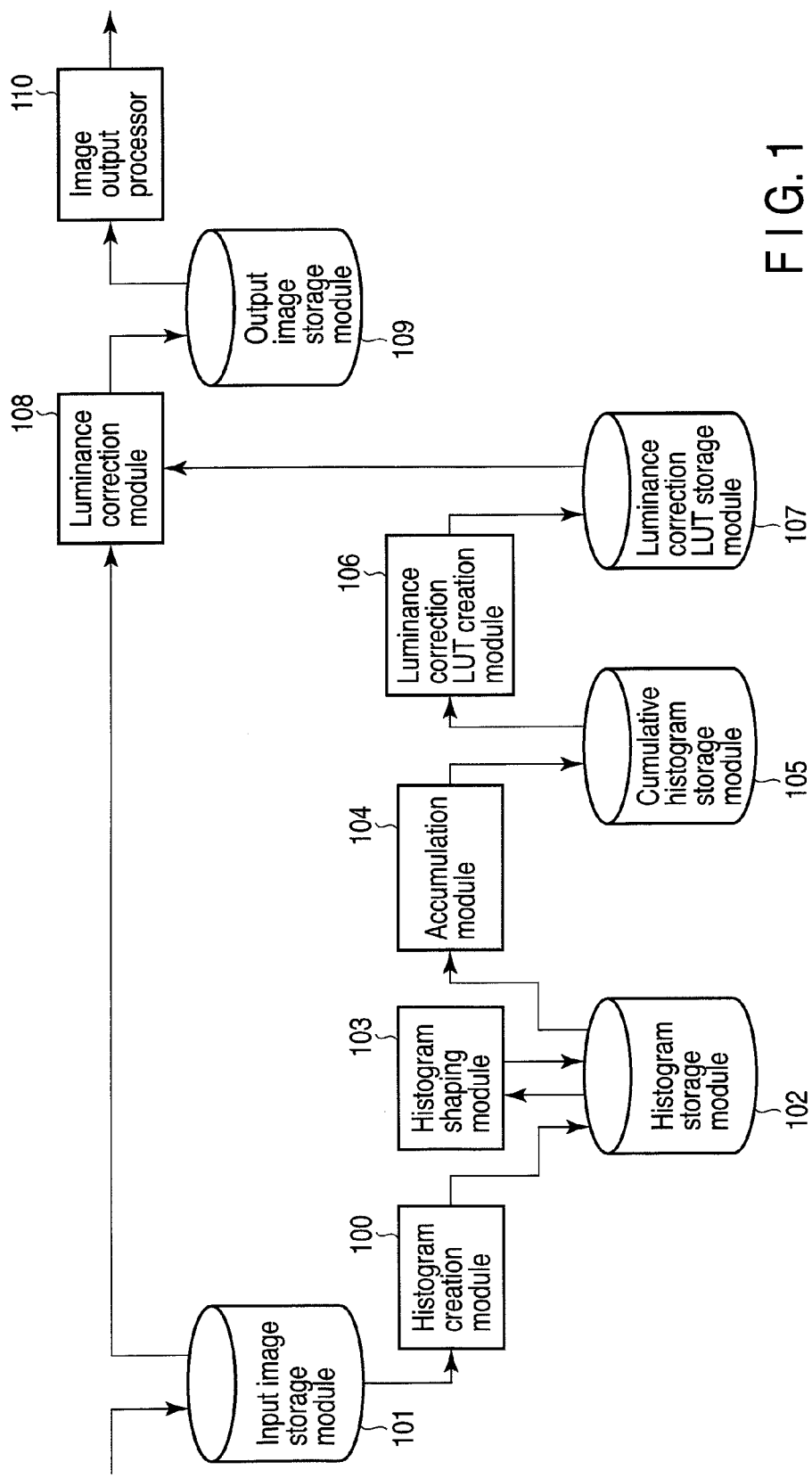
F I G. 1

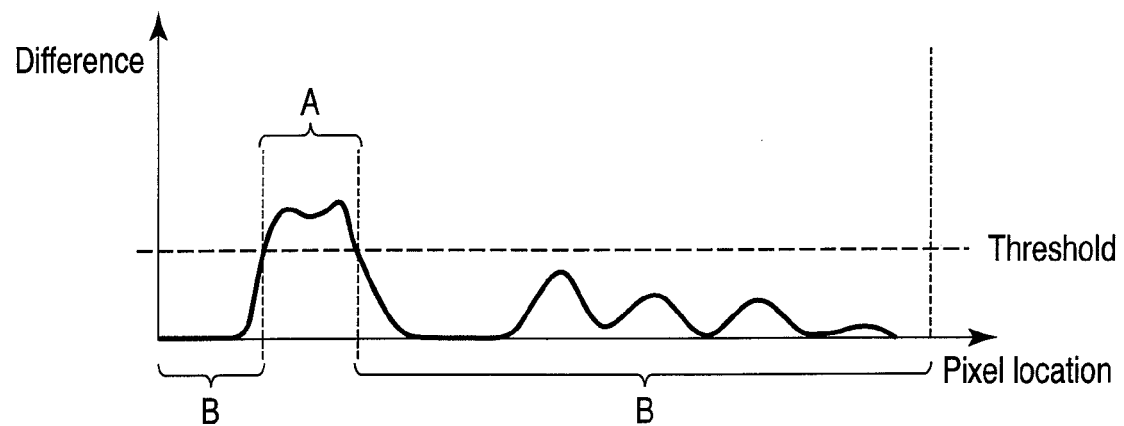
F I G. 5
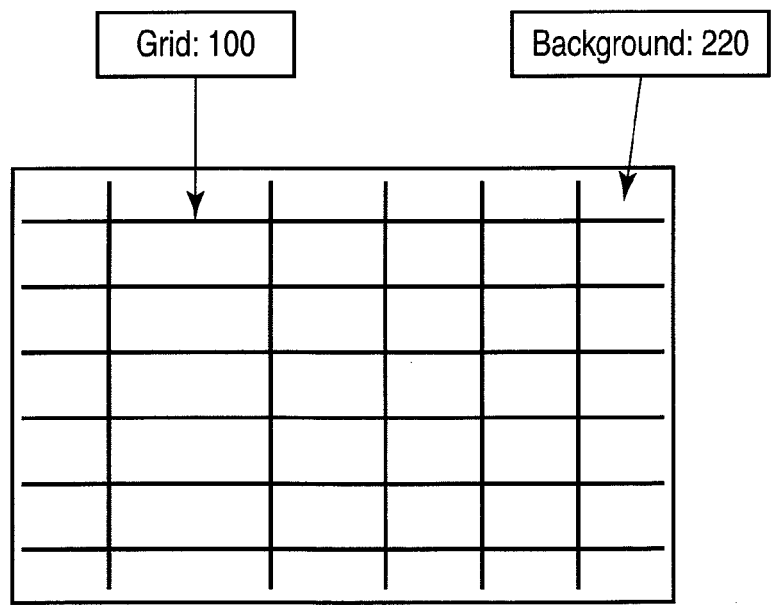
F I G. 6

IMAGE CORRECTION APPARATUS AND CORRECTION PARAMETER CREATION APPARATUS

CROSS-REFERENCE TO RELATED APPLICATIONS

This application is based upon and claims the benefit of priority from Japanese Patent Application No. 2010-187530, filed Aug. 24, 2010; the entire contents of which are incorporated herein by reference.

FIELD

Embodiments described herein relate generally to image correction by histogram equalization.

BACKGROUND

Image correction is sometimes performed when an image obtained from a storage medium (a disk medium, a memory card, etc.) or a communication medium (broadcast wave, Internet Protocol [IP] network, etc.) is output on a display device (a liquid crystal display [LCD], an organic light emitting device [OLED] display, etc.). For example, with histogram equalization which is one of image correction procedures, a corrected output image can be obtained by equalizing the distribution of pixel values (e.g., luminance values) of an input image.

In histogram equalization, a pixel value with a higher frequency tends to be corrected in a greater scale. For example, in an image containing local low-luminance pixel (e.g., outlines), such pixels are corrected to a relatively brighter scale; as a result, the contrast between the pixels and the other pixels may be deteriorated. For example, the outline is corrected to a relatively brighter scale compared to the area around the outline; as a result, the image may become blurred.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing an example of an image correction apparatus according to an embodiment.

FIG. 5 is an explanatory drawing of histogram creation.

FIG. 6 is an example of an input image.

DETAILED DESCRIPTION

Figure 2:
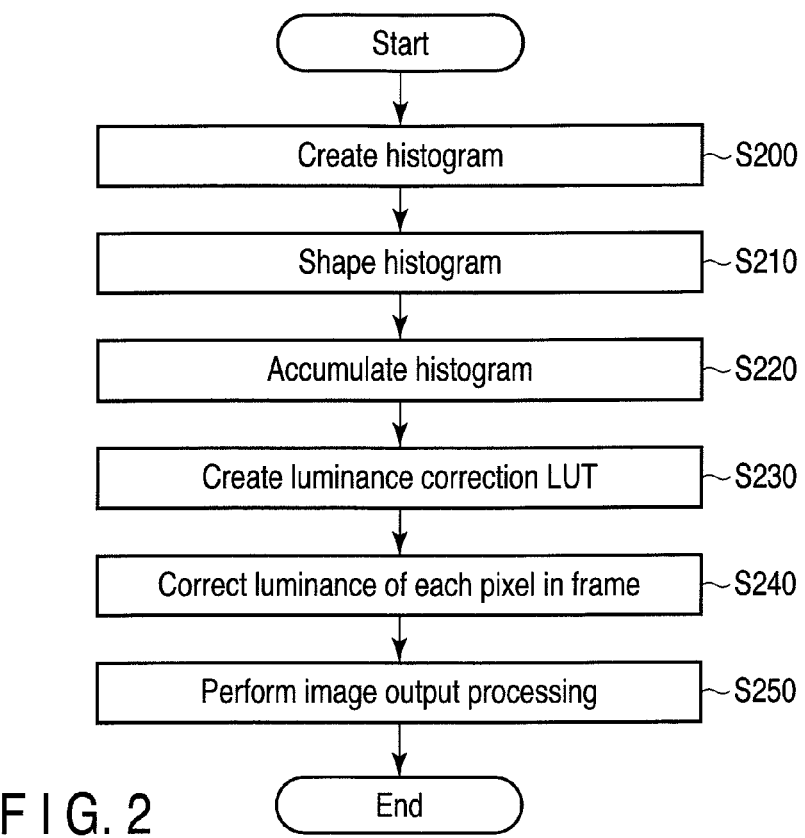
FIG. 2 is a flowchart showing the operation of the image correction apparatus shown in FIG. 1.

Various embodiments will be described hereinafter with reference to the accompanying drawings.

In general, according to one embodiment, a correction parameter creation apparatus includes a histogram creation module and a parameter creation module. The histogram creation module is configured to create a histogram of luminance values in an input image. The parameter creation module is configured to create a parameter indicating an input-output characteristic to correct the input image by equalizing the histogram. Where the histogram creation module is configured to determine whether a target pixel in the input image is a local low-luminance pixel or not, and omit to count a frequency of a luminance value of the target pixel if the target pixel is determined to be the local low-luminance pixel.

Embodiment

An image correction apparatus according to an embodiment, as shown in FIG. 1, including a histogram creation module 100, an input image storage module 101, a histogram storage module 102, a histogram shaping module 103, an accumulation module 104, an cumulative histogram storage module 105, a luminance correction look-up table (LUT) creation module 106, a luminance correction LUT storage module 107, a luminance correction module 108, an output image storage module 109, and an image output processor 110.

In the following, an example of correcting a luminance value in an input image using a parameter (e.g., a luminance correction LUT) which is created for image correction based on a luminance value in the input image will be explained. It should be noted that the explanation is not limited to correction of a luminance value in an input image; rather, it is applicable to correction of various types of pixel values. Also, a luminance value in an input image will be expressed in eight-bit length in the present embodiment; however, the luminance value can be expressed by making the bit length longer or shorter.

An input image to be corrected by the image correction apparatus shown in FIG. 1 is stored in the input image storage module 101 at least temporarily. The input image is obtained from, for example, a storage medium or a communication medium, and is decoded as needed and stored in the input image storage module 101. The input image may be a still image or any one of a plurality of frames included in a moving picture. Or, if it is assumed that the image correction apparatus according to the present embodiment performs image correction adaptively on a certain local area of a frame, the input image may be a local area within a single frame. The input image stored in the input image storage module 101 is read by the histogram creation module 100 to create a parameter for image correction or read by the luminance correction module 108 for performing image correction using the parameter.

The histogram creation module 100 creates a histogram of luminance values in the input image. The histogram creation module 100 creates a histogram basically following the expression (1) below:

$$\text{histo}Y[Y]+=1(Y=0,\ldots,255) \qquad (1)$$

In the expression (1), histoY represents an array in a size according to a bit length of a luminance value Y in the input image (for example, if the bit length is 8, the size is 256). The expression (1) shows that every frequency of the luminance value Y for all target pixels in the input image is counted one by one. Herein, a luminance value Y corresponds to a Y signal value if the input image is expressed in YUV format. If the input image is expressed in RGB format, the luminance value Y corresponds to a maximum value among RGB signal values, as shown in the following expression (2).

$$Y = \begin{cases} R & \text{if } (R > G, R > B) \\ G & \text{if } (G > R, G > B) \\ B & \text{if } (B > R, B > G) \end{cases} \quad (2)$$

As described later, note that a histogram created by the histogram creation module 100 does not always coincide to an actual luminance distribution in the input image. The histogram created by the histogram creation module 100 is stored in the histogram storage module 102.

The histogram shaping module 103 reads the histogram created by the histogram creation module 100 (hereinafter, may be referred to as a "raw histogram") from the histogram storage module 102 and the module shapes the histogram. Specifically, the histogram shaping module 103 performs, for example, offset adding and clipping. An example of offset adding process is denoted in the following expression (3).

$$histoY[Y] += \text{OFFSET}(Y=0,\ldots,255) \quad (3)$$

In the expression (3), OFFSET represents an arbitrary value such as a value which is obtained by multiplying the number of pixels included in the input image with a predetermined ratio (<1). In other words, the expression (3) means to add OFFSET to each frequency of the histogram. The clipping is performed to limit each frequency in the histogram so as not to exceed a predetermined upper limit value. If the luminance distribution in the input image is uneven, the distribution can be improved by shaping the histogram, and it becomes difficult to derive an extreme input-output characteristic. The shaped histogram is stored in the histogram storage module 102 by the histogram shaping module 103.

The raw histogram and the shaped histogram are stored in the histogram storage module 102 at least temporarily. The raw histogram stored in the histogram storage module 102 is read by the histogram shaping module 103 as needed, and the shaped histogram stored in the histogram storage module 102 is read by the accumulation module 104 as needed.

The accumulation module 104 reads the shaped histogram from the histogram storage unit 102 and accumulates frequencies of the shaped histogram to calculate a cumulative histogram. The accumulation module 104 calculates a cumulative histogram by following the expression (4) below for example.

$$AccHistoY[Y] = \sum_{x=0}^{Y} histoY[x] \quad (4)$$

In the expression (4), AccHisto[Y] represents a cumulative frequency corresponding to a luminance value Y. The cumulative histogram calculated by the accumulation module 104 is stored in the cumulative histogram storage module 105. The cumulative histogram is stored in the cumulative histogram storage module 105 at least temporarily. The cumulative histogram stored in the cumulative histogram storage module 105 is read by the luminance correction LUT creation module 106 as needed.

The luminance correction LUT creation module 106 reads the cumulative histogram from the cumulative histogram storage module 105 and normalizes the cumulative histogram. The luminance correction LUT creation module 106 creates a luminance correction LUT having an input-output characteristic corresponding to the normalized cumulative histogram. The luminance correction LUT creation module 106 creates the luminance correction LUT by following the expression (5) below, for example.

$$LUT[Y] = YoutMax \times \frac{AccHistoY[Y]}{AccHistoY[255]} \quad (5)$$

In the expression (5), LUT[Y] represents an output luminance value corresponding to an input luminance value Y, and YoutMax represents a maximum value of the output luminance values. YoutMax may be a maximum luminance value that can be expressed in a bit length of a display device on which an output image is displayed ("255" for an 8-bit panel). Or, YoutMax may be a luminance value less than the maximum luminance value that can be expressed in a bit length of a display device, if a display device is a self-emission device such as an OLED display. By such a limitation of a maximum output luminance value, a power consumed by a panel can be efficiently reduced. According to the expression (5), a maximum value of an input luminance value Y (=255) corresponds to YoutMax, and other luminance value Y corresponds to a value obtained by scaling YoutMax with a normalized cumulative frequency. The luminance correction LUT created by the luminance correction LUT creation module 106 is stored in the luminance correction LUT storage module 107. The luminance correction LUT is stored in the luminance correction LUT storage module 107, at least temporarily. The luminance correction LUT stored in the luminance correction LUT storage module 107 is read by the luminance correction module 108 as needed.

The luminance correction module 108 reads the input image from the input image storage module 101 and the luminance correction LUT from the luminance correction LUT storage module 107. The luminance correction module 108 corrects an input luminance value Y in the input image to an output luminance value Yout using the luminance correction LUT, as shown in the following expression (6):

$$Yout = LUT[Y] \quad (6)$$

The corrected image is stored in the output image storage module 109 by the luminance correction module 108. The corrected image from the luminance correction module 108 is stored in the output image storage module 109 at least temporarily. The corrected image stored in the output image storage module 109 is read by the image output processor 110 as needed.

The image output processor 110 reads the corrected image from the output image storage module 109. Then, the image output processor 110 reproduces the output image based on the color difference value and the corrected luminance value of each target pixel to output the image on a display device (not shown).

In the following, an example of the operation of the image correction apparatus shown in FIG. 1 will be explained with reference to FIG. 2.

Figure 3:
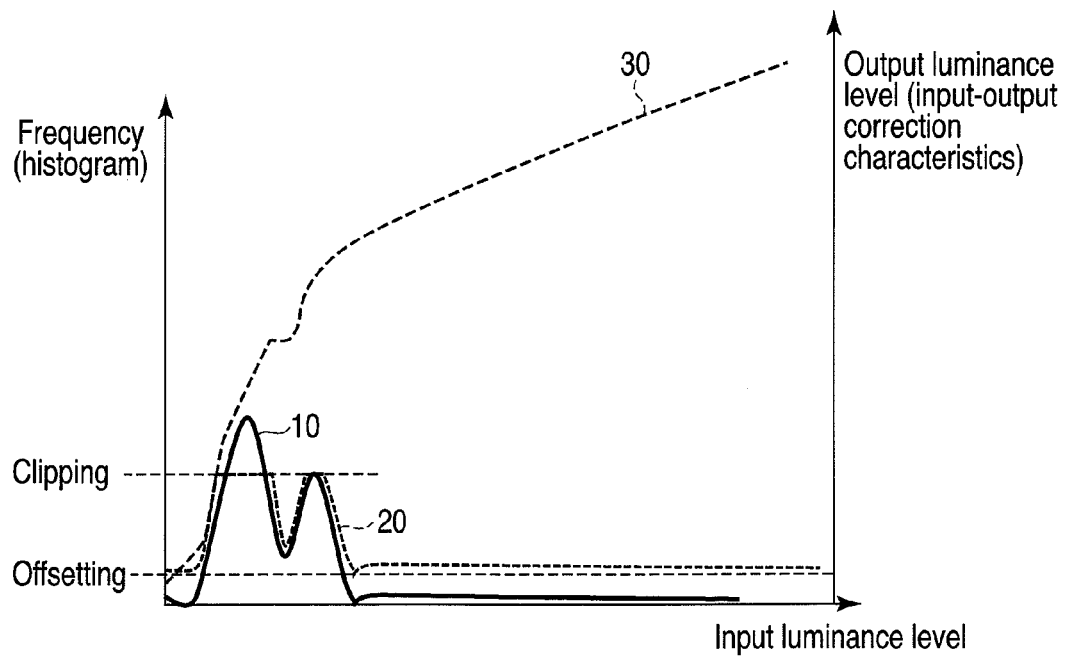
FIG. 3 is an explanatory drawing of histogram shaping and an input-output characteristic of a luminance correction LUT.

The histogram creation module 100 creates a histogram of luminance values in the input image (step S200). The details of step S200 will be described later with reference to FIG. 4. The histogram shaping module 103 shapes the raw histogram created in step S200 (step S210). For example, as shown in FIG. 3, the histogram shaping module 103 obtains a shaped histogram 20 by shaping the raw histogram 10 (offset adding process and clipping process).

The accumulation module 104 accumulates the histogram shaped in step S210 to calculate a cumulative histogram (step S220). The luminance correction LUT creation module 106 normalizes the cumulative histogram calculated in step S220 and creates a luminance correction LUT having an input-output characteristic corresponding to the normalized cumulative histogram (step S230). The luminance correction LUT has, for example, an input-output characteristic 30 shown in FIG. 3.

The luminance correction module 108 corrects the luminance value in the input image using the luminance correction LUT created in step S230 (step S240). The image output processor 110 reproduces an output image based on a color difference value and the corrected luminance value obtained in step S230 of each target pixel, and the output image is output on a display device (not shown) (step S250).

Figure 4:
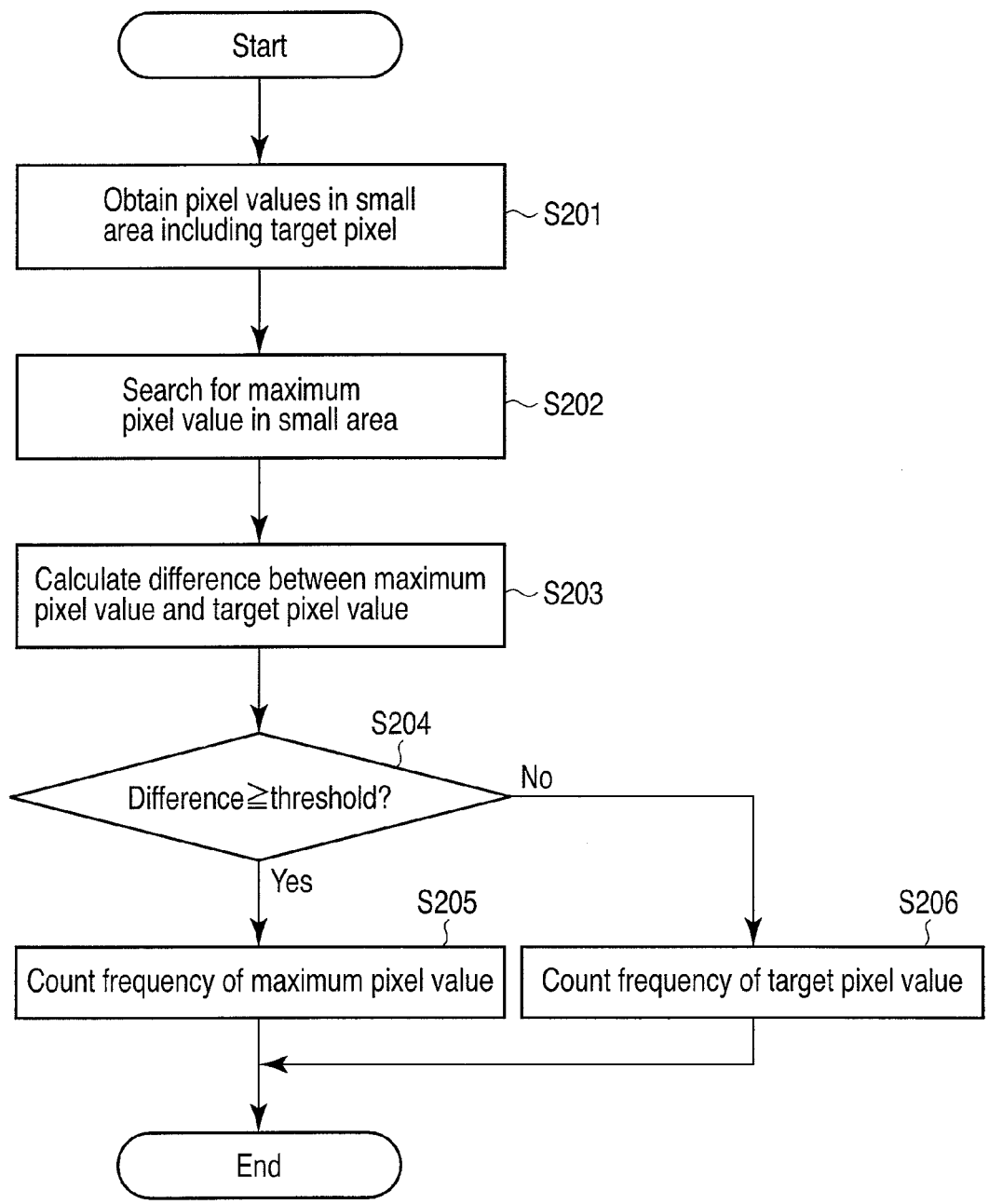
FIG. 4 is a flowchart showing the operation of the histogram creation module shown in FIG. 1.

In the following, an example of step S200 is described in detail with reference to FIG. 4. The series of the process illustrated in FIG. 4 is basically performed for all pixels in the input image (alternatively, it is possible not to perform the process on some of the pixels).

The histogram creation module 100 obtains pixel values (luminance values) in a small area including target pixels (step S201). Herein, the term "small area" means that the size of the area is relatively smaller than entire area of the input image. The term does not intend to limit an absolute size of the area. The small area is a rectangular region of N×M pixels including target pixels (N and M are arbitrary integers, and N may equals to M). A typical position of target pixels in the small area is near the center of the region but not limited thereto. The shape of the small area is also not limited to rectangle. For example, the size of the small area may vary for each input image. The size of the small area may be determined in accordance with the size of a pixel area to store a contrast around the pixel area. Specifically, if a contrast around an outline area is stored, a relatively small size is desirable to use; on the other hand, if a contrast around a picture (a cluster of pixels) area is to be stored, a relatively large size is desirable.

The histogram creation module 100 searches for a maximum luminance value in the small area obtained in step S201 (step S202). The histogram creation module 100 calculates a difference between a luminance value of a target pixel and the maximum luminance value searched in step S202 (step S203). The histogram creation module 100 compares the difference calculated in step S203 and a predetermined threshold (step S204).

The threshold is a parameter to determine whether the target pixel is a local low-luminance pixel or not. The threshold may be determined through design or experiment. The histogram creation module 100 may use a different method to determine whether the target pixel is a local low-luminance pixel or not.

The histogram creation module 100 counts a frequency of the maximum luminance value in the small area instead of the luminance value of the target pixel if the difference is equal to or greater than the threshold (in other words, if the module determines that the target pixel is a local low-luminance pixel) (step S205). On the other hand, the histogram creation module 100 counts a frequency of the luminance value of the target pixel if the difference is less than the threshold (in other words, the module determines that the target pixel is not a local low-luminance pixel) (step S206). In other words, the histogram creation module 100 counts a frequency by following the expression (7) below in steps S205 and S206

$$Y(i, j) = \begin{cases} in(i, j) & \text{if } (|adMax(i, j) - in(i, j)| < Th) \\ adMax(i, j) & \text{else} \end{cases} \quad (7)$$

In the expression (7), in (i, j) represents the luminance value of the target pixel that has coordinates (i, j) in the input image, adMax (i, j) represents the maximum luminance value in the small area including the target pixel, Th represents the threshold, and Y(i, j) represents a luminance value whose frequency is to be counted with respect to the target pixel.

FIG. 5 illustrates each pixel on an arbitrary line of an input pixel and a difference corresponding to the pixel. In FIG. 5, A represents a set of pixels of which the difference is equal to or greater than a threshold (i.e., a set of pixels that is determined to be local low-luminance pixels), and B represents a set of pixels of which the difference is less than a threshold (i.e., a set of pixels that is determined not to be local low-luminance pixels).

With respect to the pixels belong to set A, by omitting counting a frequency of the luminance value of the target pixel, a histogram in which the frequency on the low-luminance side is less than the actual luminance distribution in the input image is created. In other words, as the frequencies are not concentrated on the low-luminance side, contrast deterioration due to correction of local low-luminance pixels to a brighter scale can be prevented. In the present embodiment, when counting a frequency of a luminance value of a target pixel is omitted, a frequency of the other luminance value is counted as an alternative as shown in the expression (7). However, when the counting a frequency of a luminance value of a target pixel is omitted, it is also possible to configure the present embodiment not to change a frequency of any luminance value. According to such a configuration, it is apparent that a histogram in which the frequency on the low-luminance side is less than the actual luminance distribution in the input image can be created.

Also, with respect to the pixels belong to set A, by counting a frequency of a maximum luminance value in a small area including a target pixel, a histogram in which the frequency on the high-luminance side is greater than the actual luminance distribution in the input image is created. In other words, frequencies are concentrated on the high-luminance side, contrast deterioration due to correction of a local low-luminance pixel to a brighter scale can be prevented.

On the other hand, a pixel which belongs to a set B may be a local medium- or high-luminance pixel, or may be a pixel in an area where luminance values are flat (for example, a moderate gradation). Suppose if a frequency of a maximum luminance value in a small area including a target pixel is counted with respect to the pixels in the area where luminance values are flat, frequencies which are originally dispersed evenly may be unevenly counted and may result in breaking gradations when performing image correction. For this reason, in the present embodiment, a frequency of a luminance value of a target pixel with respect to the pixels that belong to set B is counted to reflect the original dispersion of the luminance values in a flat area, thereby preventing breaking gradations.

In the following, a case of performing image correction on an exemplary input image shown in FIG. 6 by conventional histogram equalization is compared with a case of performing image correction according to the present embodiment. The input image shown in FIG. 6 includes background pixels of relatively high-luminance and grid pixels of relatively low-luminance. For simplicity, the luminance value of a background pixel is "220" and the luminance value of a grid pixel is "100." With respect to the image correction according to the present embodiment, the size of the small area is larger than a thickness of each grid (in other words, each small area including a target pixel contains at least one background pixel). In addition, a threshold is "120" at maximum.

Figure 7:
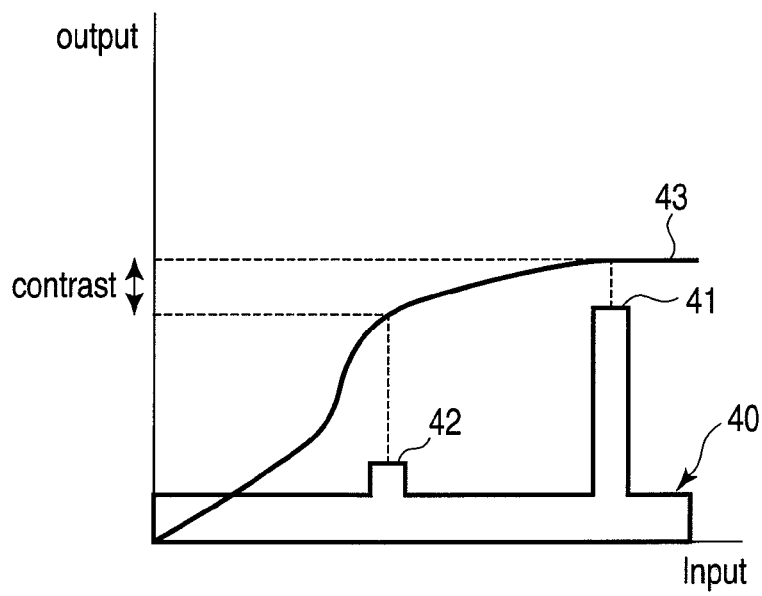
FIG. 7 is an exemplary drawing of image correction performed for the input image of FIG. 6, according to a comparative example.

When the image correction by the conventional histogram equalization is applied to the input image of FIG. 6, a histogram is created based on the distribution of luminance values in the input image. By shaping this histogram, a histogram 40, such as the one shown in FIG. 7, can be obtained. As the histogram 40 has a peak at a frequency 41 for the background luminance value and a frequency 42 for the grid luminance value, the cumulative histogram suddenly changes (increases) around the grid luminance value. In other words, the input-output characteristic of correction 43 also changes suddenly around the grid luminance value like the cumulative histogram. Therefore, the contrast between the grid and the background is greatly deteriorated in the corrected image. For example, the background luminance value is corrected to "152"; on the other hand the grid luminance value is corrected to "112"; as a result, the original luminance value difference "120" is deteriorated to "40."

Figure 8:
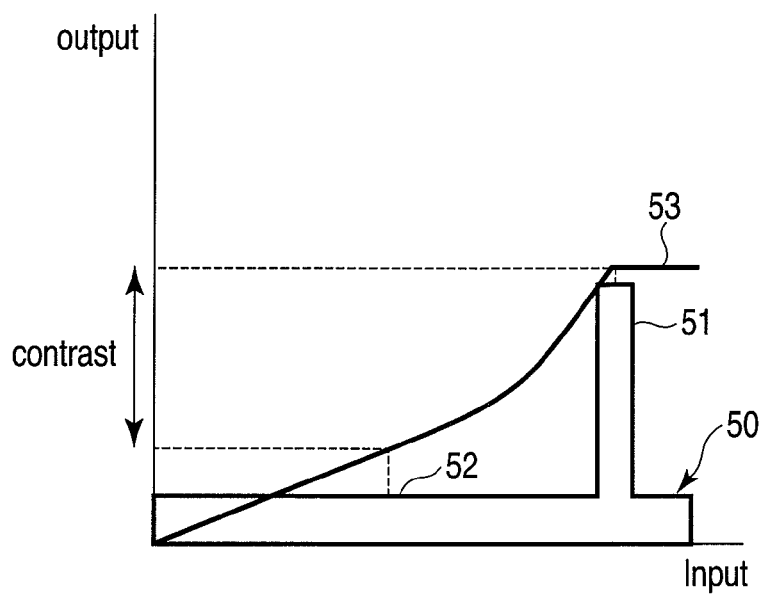
FIG. 8 is an exemplary drawing of image correction performed for the input image of FIG. 6, according to an embodiment.

In contrast, when the image correction according to the present embodiment is applied to the input image of FIG. 6, a histogram is created by counting the frequency of the background luminance value for each grid pixel instead of the grid luminance value. By shaping the histogram, a histogram 50, such as the one shown in FIG. 8, can be obtained. Although the histogram 50 has a peak at a frequency 51 for a background luminance value, the histogram has no peak for the frequency 52 for the grid luminance value. Accordingly, the cumulative histogram gradually changes (increases) around the grid luminance value. In other words, the input-output characteristic 53 of correction also changes gradually around the grid luminance value like the cumulative histogram. Therefore, the contrast between the grid and the background is maintained in the corrected image. For example, the background luminance value is corrected to "151"; on the other hand the grid luminance value is corrected to "36"; as a result, the luminance value difference "115" which is close to the original luminance value difference "120" is maintained.

As explained in the above, the image correction apparatus according to the present embodiment creates a histogram of luminance values in an input image by omitting counting a frequency of luminance value of a target pixel when it is determined that the target pixel in the input image is a local low-luminance pixel. As a result, according to the image correction apparatus according to the present embodiment, a frequency tends not to concentrate on the low-luminance side, and thus, contrast deterioration due to correcting of local low-luminance pixel to a brighter scale can be prevented.

Furthermore, in the present embodiment, although the example of omitting counting a frequency of a luminance value of a target pixel when the target pixel is determined to be a local low-luminance pixel has been explained, a histogram may be created using a different method. The image correction apparatus, for example, may create a histogram by counting a frequency of the luminance value of the target pixel with a first value (e.g., "1") when the target pixel is not a local low-luminance pixel, and by counting a frequency of the luminance value of the target pixel with a second value (e.g., "0.1") when the target pixel is a local low-luminance pixel. The second value is smaller than the first value.

In the present embodiment, the image correction apparatus is illustrated. However, the present embodiment is applicable to a correction parameter creation apparatus for creating parameters, such as a luminance correction LUT as aforementioned. Such a correction parameter creation apparatus can be realized by employing the histogram creation module 100, the input image storage module 101, the histogram storage module 102, the histogram shaping module 103, the accumulation module 104, the cumulative histogram storage module 105, the luminance correction look-up table (LUT) creation module 106. It also should be noted that an input-output characteristic can be expressed in any form, for example, in a form of a function, while the input-output characteristic of image correction is expressed in a form of a LUT in the present embodiment.

It is possible to provide a program that realizes the processing performed in the present embodiment by storing the program in a computer-readable storage media. The storage medium may be any storage medium as long as it can store a program and is readable by a computer, such as a magnetic disk, an optical disc (CD-ROM, CD-R, DVD), a magneto-optical disc (such as MO), and a semiconductor memory. Also, the program that realizes the processing performed in the present embodiment may be stored on a computer (server) connected to network such as the Internet and may be downloaded by a computer (client) via the network.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A correction parameter creation apparatus, comprising:
a histogram creator configured to create a histogram of luminance values based on an input image; and
a parameter creator configured to create a parameter, the parameter indicative of an input-output characteristic configured for histogram equalization,
wherein the histogram creator is configured to determine whether a target pixel in the input image is a local low-luminance pixel, the histogram creator further configured to omit counting a frequency of a luminance value of the target pixel if the target pixel is determined to be a local low-luminance pixel, the histogram creation module creator further configured to count a frequency of a maximum luminance value in an area of the input image if the target pixel is determined to be the local low-luminance pixel, the area comprising the target pixel in the input image, and
wherein the histogram creator is configured to determine that the target pixel is the local low-luminance pixel if a difference between a maximum luminance value in a predetermined area comprising the target pixel in the input image and the luminance value of the target pixel is equal to or greater than a threshold, the histogram creator configured to determine that the target pixel is not the local low-luminance pixel if the difference is less than the threshold.

2. The apparatus of claim 1, wherein the histogram creator is configured to count a frequency of the luminance value of the target pixel, if the target pixel is determined not to be the local low-luminance pixel.

3. A correction parameter creation apparatus, comprising:
a histogram creator configured to create a histogram of luminance values in an input image by:
determining whether a target pixel in the input image is a local low-luminance pixel,
counting a frequency of a luminance value of the target pixel by a first value if the target pixel is determined not to be the local low-luminance pixel,
counting a frequency of the luminance value of the target pixel by a second value if the target pixel is determined to be the local low-luminance pixel, the second value being smaller than the first value, and
counting a frequency of a maximum luminance value in an area of the input image by the first value if the target pixel is determined to be the local low-luminance pixel, the area comprising the target pixel in the input image; and
a parameter creator configured to create a parameter indicating an input-output characteristic to be used in correcting the input image by equalizing the histogram,
wherein the histogram creator is configured to determine that the target pixel is the local low-luminance pixel if a difference between a maximum luminance value in a predetermined area comprising the target pixel in the input image and the luminance value of the target pixel is equal to or greater than a threshold, and if not, the target pixel is not the local low-luminance pixel.

4. An image correction apparatus, comprising:
a histogram creator configured to create a histogram of luminance values based on an input image;
a parameter creator configured to create a parameter, the parameter indicative of an input-output characteristic configured for histogram equalization; and
an image correction module configured to obtain an output image by correcting the input image in accordance with the parameter,
wherein the histogram creator is configured to determine whether a target pixel in the input image is a local low-luminance pixel, the histogram creator further configured to omit counting a frequency of a luminance value of the target pixel if the target pixel is determined to be a local low-luminance pixel, the histogram creator further configured to count a frequency of a maximum luminance value in an area of the input image if the target pixel is determined to be the local low-luminance pixel, the area comprising the target pixel in the input image, and
wherein the histogram creator is configured to determine that the target pixel is the local low-luminance pixel if a difference between a maximum luminance value in a predetermined area comprising the target pixel in the input image and the luminance value of the target pixel is greater than a threshold the histogram creator configured to determine that the target pixel is not the local low-luminance pixel if the difference is less than the threshold.

5. The apparatus of claim 4, wherein, the histogram creator is configured to count a frequency of the luminance value of the target pixel if the target pixel is determined not to be the local low-luminance pixel.

* * * * *